United States Patent
Dumas et al.

(10) Patent No.: US 6,182,607 B1
(45) Date of Patent: Feb. 6, 2001

(54) ANIMAL FEEDER HAVING A DRUM FEED TRANSPORT DEVICE

(75) Inventors: Gilles Dumas, St-Henri de Lévis; Raymond Lemelin, La Durantaye; Bruno Leclerc, Lévis, all of (CA)

(73) Assignee: Les Industries G. Dumas Inc., Quebec (CA)

( * ) Notice: Under 35 U.S.C. 154(b), the term of this patent shall be extended for 0 days.

(21) Appl. No.: 09/149,750

(22) Filed: Sep. 8, 1998

(51) Int. Cl.$^7$ .................................................. A01K 1/10
(52) U.S. Cl. ........................ 119/52.1; 119/54; 119/56.1; 119/51.5
(58) Field of Search .................. 119/52.1, 53.5, 119/54, 56.1, 71, 51.5

(56) References Cited

U.S. PATENT DOCUMENTS

| | | | | |
|---|---|---|---|---|
| 1,190,028 | * | 7/1916 | Smith | 119/53.5 |
| 1,326,273 | * | 12/1919 | Knutson | 119/53.5 |
| 1,433,904 | * | 10/1922 | Mudge | 119/52.1 |
| 1,680,181 | * | 8/1928 | Smith | 119/52.1 |
| 3,782,334 | * | 1/1974 | Leon et al. | 119/54 |
| 4,050,415 | * | 9/1977 | Conger | 119/51.5 |
| 4,246,678 | * | 1/1981 | Cunningham | 119/54 |
| 4,790,266 | * | 12/1988 | Kleinsasser | 119/51.5 |
| 4,825,811 | * | 5/1989 | O'Kelley | 119/51.5 |
| 5,275,130 | * | 1/1994 | Muckler | 119/53.5 |

FOREIGN PATENT DOCUMENTS

| | | | | |
|---|---|---|---|---|
| 329278 | * | 4/1958 | (CH) | 119/53.5 |
| 259211 | * | 4/1913 | (DE) | 119/56.1 |
| 2819403 | * | 11/1978 | (DE) | 119/54 |
| 3213954 | * | 7/1983 | (DE) | 119/51.5 |
| 109104 | * | 4/1984 | (EP) | 119/56.1 |
| 1136760 | * | 5/1957 | (FR) | 119/56.1 |
| 2258125 | * | 8/1975 | (FR) | 119/51.5 |
| 2373227 | * | 7/1978 | (FR) | 119/56.1 |
| 214128 | * | 4/1924 | (GB) | 119/54 |
| 215942 | * | 5/1924 | (GB) | 119/54 |
| 220416 | * | 8/1924 | (GB) | 119/53.5 |
| 446475 | * | 4/1936 | (GB) | 119/53.5 |
| 704254 | * | 2/1954 | (GB) | 119/56.1 |
| 805211 | * | 9/1958 | (GB) | 119/51.5 |
| 506313 | * | 4/1957 | (IT) | 119/52.1 |
| 37258 | * | 3/1927 | (SE) | 119/56.1 |
| 74145 | * | 4/1932 | (SE) | 119/56.1 |
| 954074 | * | 8/1982 | (SU) | 119/56.1 |
| 1056969 | * | 11/1983 | (SU) | 119/56.1 |

* cited by examiner

*Primary Examiner*—Michael J. Carone
*Assistant Examiner*—Fredrick T. French, III
(74) *Attorney, Agent, or Firm*—Carter & Schnedler, P.A.

(57) ABSTRACT

An animal feeder is comprised of a feed hopper for the containment of animal feed and having feed discharge drums located in a lower section of the hopper. The drums are provided with feed transport cavities to transport feed from the hopper to a feed trough disposed below the hopper. The drum is maintained at a predetermined inoperative position by means of a weighted bar element which is actuated by an animal to displace the drum and transfer feed from the hopper to the feed trough. A feed arresting bar is horizontally secured at a predetermined location in each feed transport cavity to obstruct free flow of feed when the drum is in motion to a discharge position.

16 Claims, 5 Drawing Sheets

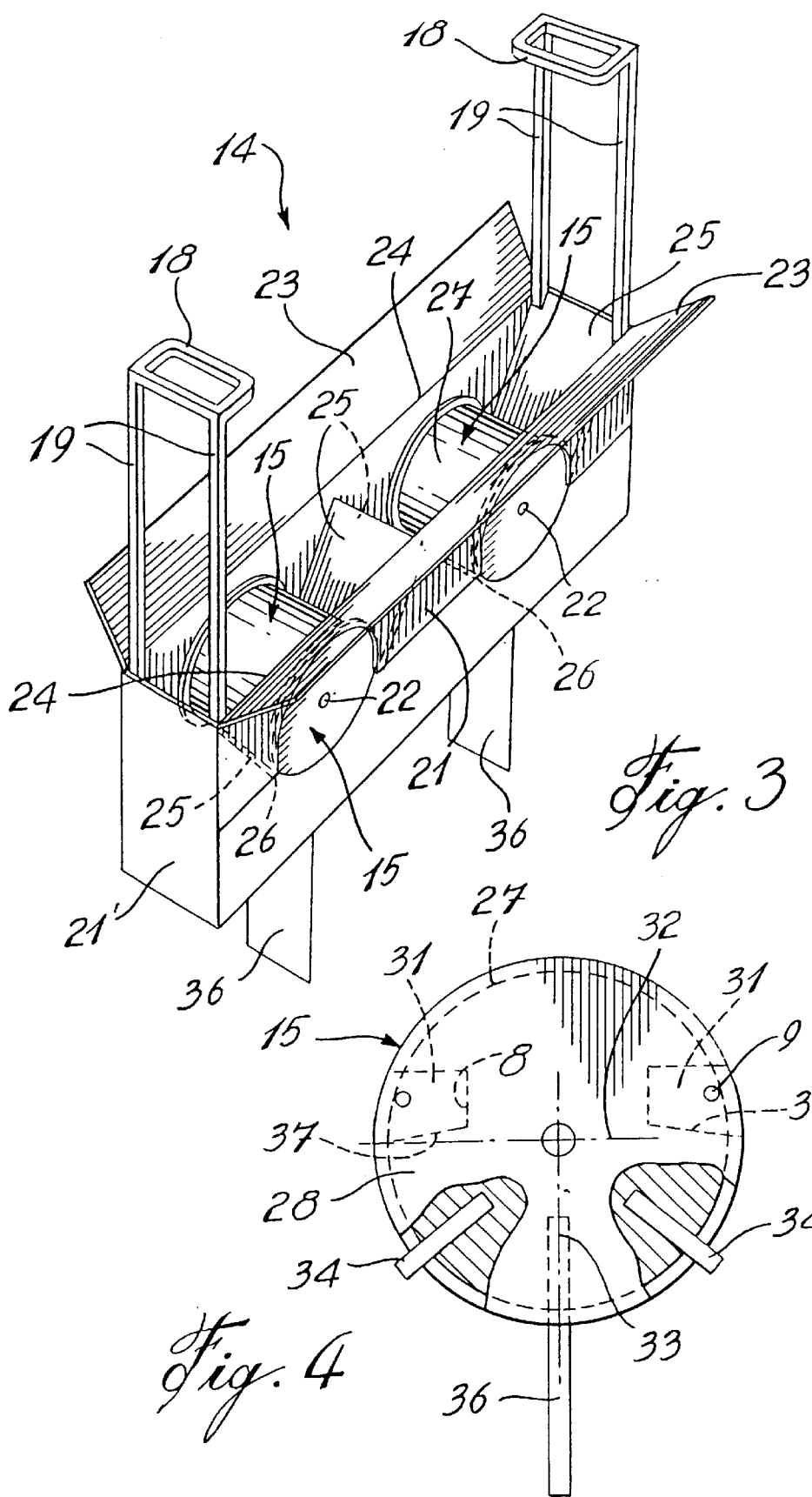

ANIMAL FEEDER HAVING A DRUM FEED TRANSPORT DEVICE

TECHNICAL FIELD

The present invention relates to an animal feeder and more particularly to a feeder having a drum feed transport device which is operated by an animal whereby to transfer feed from a hopper to a feed trough and further wherein the feed collecting and discharge compartment is formed as a separate removable unit.

BACKGROUND ART

Various animal feeders are known wherein feed is placed in a hopper and transferred to a feed trough below the hopper by an animal actuating a bar or other mechanism which is actuatable by the nose or the head of the animal. As the animal strikes or displaces the bar or other similar mechanism, in a certain direction, feed is released into the feed trough. Examples of such feeders are disclosed in U.S. Pat. Nos. 4,246,678 and 5,275,130.

A disadvantage of prior art animal feeders of the above-reference type is that they comprise complex mechanisms which often encounter mechanical break down or get jammed by the feed, rendering the feeder, or sections thereof, inoperative. Their mechanisms are also difficult to repair and most of these repairs must be done on site. Also, many of these mechanisms are provided with adjustable slot openings through which feed is released. Depending on the size of the feed grains it is necessary to adjust these slots. Accordingly, if the type of feed is changed, the feeder needs to be re-adjusted. This procedure disturbs the animals feeding at regular time intervals. Prior art feeders are also difficult to clean and not perfectly sanitary.

Another disadvantage of the prior art feeders is that the feed release mechanism which is actuated by the animals also requires adjustment depending on the size of the animals feeding. For example, a forty pound pig will hit the feed release bars with more power than will do a small pig of half that size. Also, smaller pigs cannot make long actuating head strokes. Still further, farm feed is now being provided in very fine dry particle size and is very slick and can easily flow out of the hopper trough small openings and accordingly can trickle continuously in the feed trough through the discharge slot, if not perfectly closed. The discharge mechanisms also often jam by the accumulation of feed or larger feed particles.

SUMMARY OF INVENTION

It is therefore a feature of the present invention to provide an animal feeder which substantially overcomes the above-mentioned disadvantages of the prior art.

Another feature of the present invention is to provide an animal feeder wherein feed is discharged from a feed hopper to a feed trough through a drum having feed transport cavities capable of accepting feed having grains of different sizes.

Another feature of the present invention is to provide an animal feeder provided with feed discharge drums capable of discharging feed from a feed hopper to a feed trough and constructed such as to prevent feed from seeping from the hopper to the trough without actuating the discharge drum to predetermined positions.

Another feature of the present invention is to provide an animal feeder having a feed hopper provided with a removable feed collecting and discharge compartment making it easy to clean the feeder and to repair the feed collecting and discharge compartment, if necessary.

Another feature of the present invention is to provide feed discharge drums having opposed feed transport cavities with said cavities having feed arresting means to obstruct the free flow of feed through the cavity during the displacement of the drum to its discharge position.

According to the above features, from a broad aspect, the present invention provides an animal feeder which comprises a feed hopper for the containment of animal feed. The feed hopper has inclined guide walls for directing feed towards one or more feed discharge drums in a lower section thereof. Each feed discharge drum is secured on a central support axle for rotational displacement thereon. The drum has a circumferential side wall. A portion of the circumferential side wall extends into a feed collecting compartment in the lower section of the feed hopper between opposed straight end walls of the feed collecting compartment. An inclined lower guide wall is secured between the opposed straight end walls and has a straight lower edge in frictional contact across the circumferential side wall for directing feed thereagainst. One or more feed transport cavities are provided in the circumferential side wall and displaceable by rotational displacement of the drum on the central support axle to position one of the feed transport cavities above the straight lower edge of the inclined lower guide wall sufficiently to receive the feed therein. A feed trough is spaced below the lower section of the hopper. Drum actuatable means is secured to the drum and depends at least towards the feed trough for actuation by an animal feeding from the trough whereby to discharge feed from the hopper to the trough via the transport cavities. Stopper means is provided to restrict the rotational displacement of the drum. Feed arresting means co-operate with the feed transport cavities to obstruct the flow of feed during the displacement of the drum to its discharge position.

According to a still further broad aspect of the present invention there is provided an animal feeder which comprises a feed hopper for the containment of animal feed. The feed hopper has inclined guide walls for directing feed towards a removable feed collecting and discharge compartment in a lower section thereof. Feed discharge drums are provided in the removable compartment and have one or more feed transport cavities in a circumferential side wall thereof. The cavities are displaceable by rotational displacement of the drum on a support axle whereby to position one or more of the feed transport cavities to a feed receiving position to receive feed therein from the hopper. A feed trough is spaced below the hopper. Drum actuatable means is secured to the drum and depends at least towards the feed trough for actuation by an animal feeding from the trough to discharge feed from the hopper to the trough via the transport cavities. Stopper means restricts the rotational displacement of the drum. Feed arresting means co-operate with the feed transport cavities to obstruct the flow of feed during the displacement of the drum to its discharge position.

BRIEF DESCRIPTION OF DRAWINGS

A preferred embodiment of the present invention will now be described with reference to the accompanying drawings in which:

FIG. 3 is a perspective view illustrating the construction of the removable feed collecting and discharge compartment;

FIG. 4 is a fragmented side view illustrating the construction of a drum;

DESCRIPTION OF PREFERRED EMBODIMENTS

Figure 1:
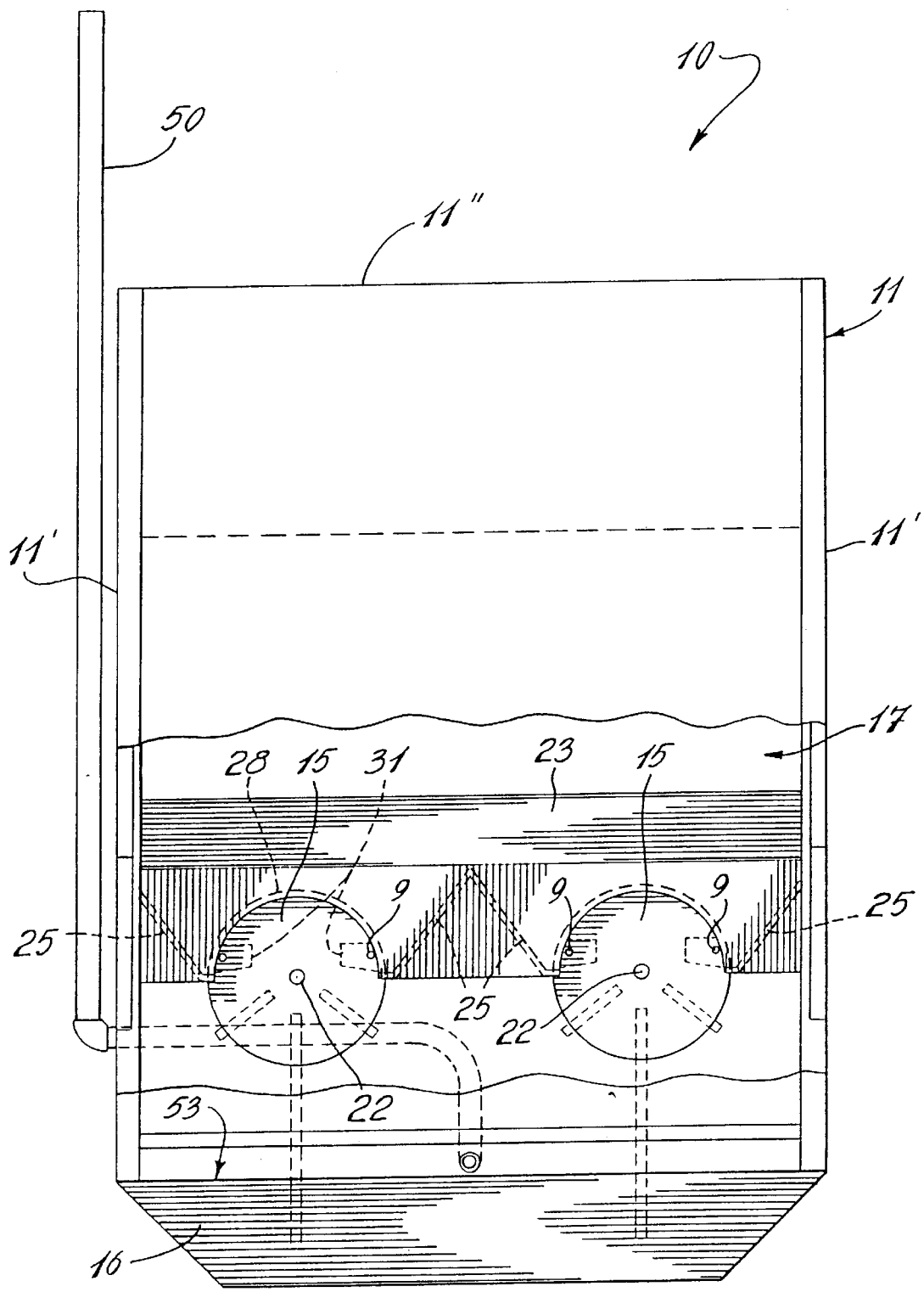
FIG. 1 is a fragmented side view of the animal feeder of the present invention.
Figure 2:
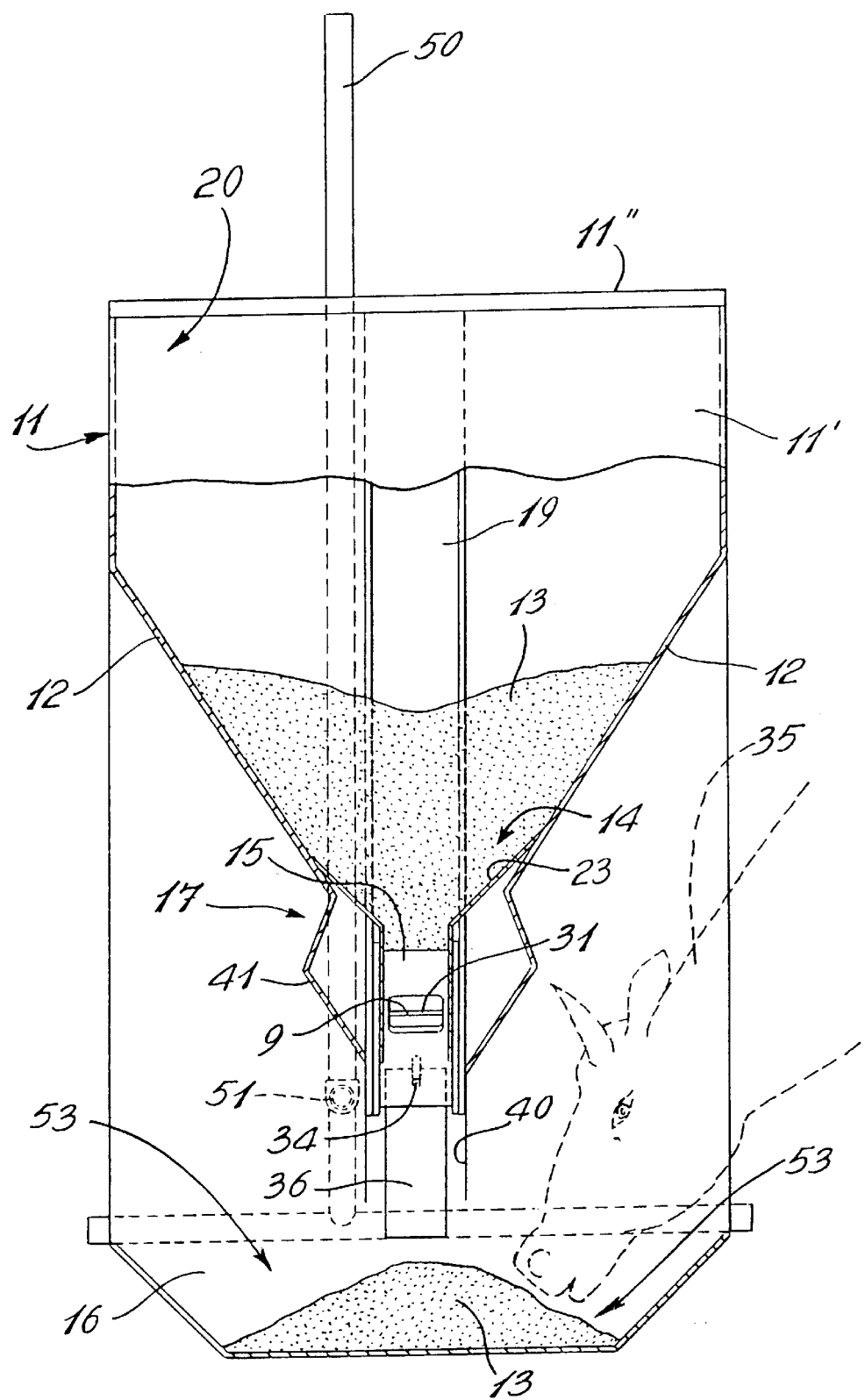
FIG. 2 is a fragmented end view of the animal feeder of the present invention as shown in FIG. 1.

Referring now to the drawings, and more particularly to FIGS. 1 and 2, there is shown the animal feeder 10 of the present invention. The feeder is comprised of a feed hopper 11 which is provided with opposed side walls 11' and inclined guide walls 12 for directing feed 13 contained within the hopper towards a feed collecting compartment 14 disposed in a lower section of the feed hopper. The top end 11" may be open or closed with a lid. The feed collecting compartment is provided with one or more, herein two, spaced-apart feed discharge drums 15 whereby to discharge the feed 13 from the hopper 11 into a feed trough 16 located spaced below the feed collecting compartment 14.

As shown in FIG. 3, the feed collecting compartment is a removable feed collecting and discharge compartment 14 which is seatingly secured in the lower section 17 of the hopper 11. The feed collecting and discharge compartment 14 is provided with vertically extending handles 18 secured to a vertically extending frame 19 projecting upwardly to a top end 20 of the feed hopper, as shown in FIG. 2, whereby to position and remove the compartment 14 from the lower section 17 of the hopper.

The removable feed collecting and discharge compartment 14 has opposed spaced-apart parallel side walls 21, end walls 21' and the discharge drums 15 are secured between the spaced apart side walls on respective central support axles 22. An outwardly angled support wall 23 projects from a respective opposed straight top edge 24 of the side walls 21 for seating support engagement on opposed ones of the inclined guide walls 12 of the hopper 11, as shown in FIG. 2. As better seen in FIG. 8, inclined lower guide walls 25 are secured between the spaced-apart side walls 21 and are provided with a straight horizontal lower wall section 26 which terminates in a straight edge 38 which is in frictional contact across the circumferential side wall 27 of the drums 15.

Figure 5:
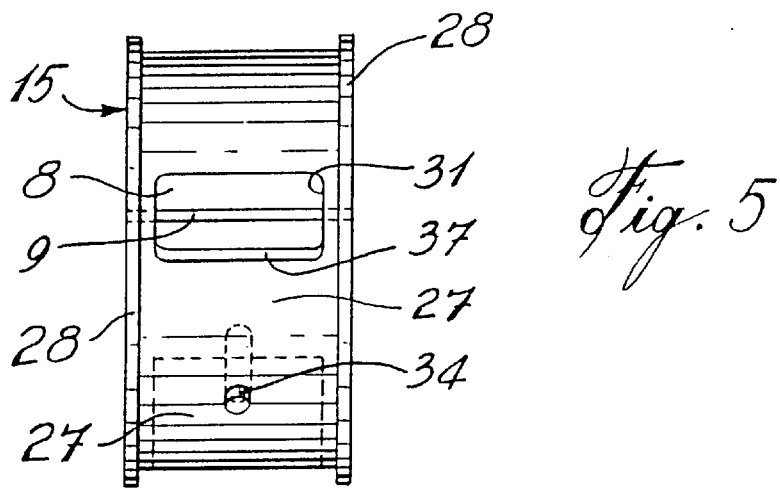
FIG. 5 is an end view of the drum of FIG. 4.
Figure 6:
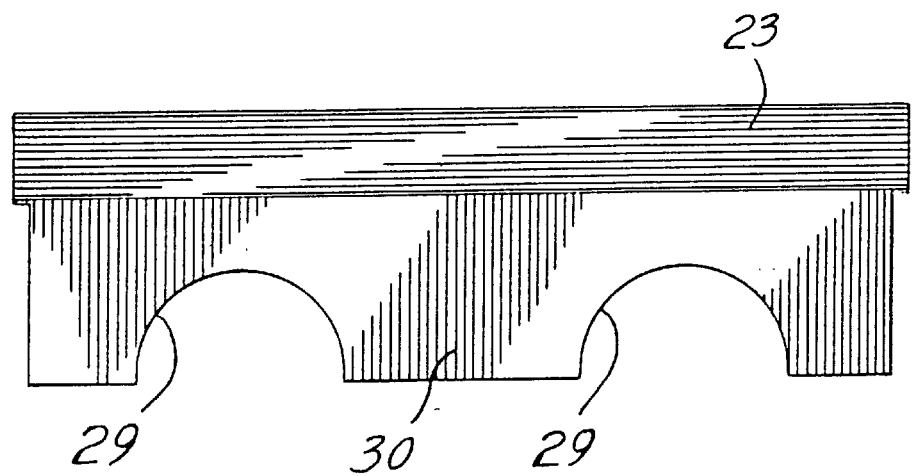
FIG. 6 is a side view of the angled support walls.
Figure 7:
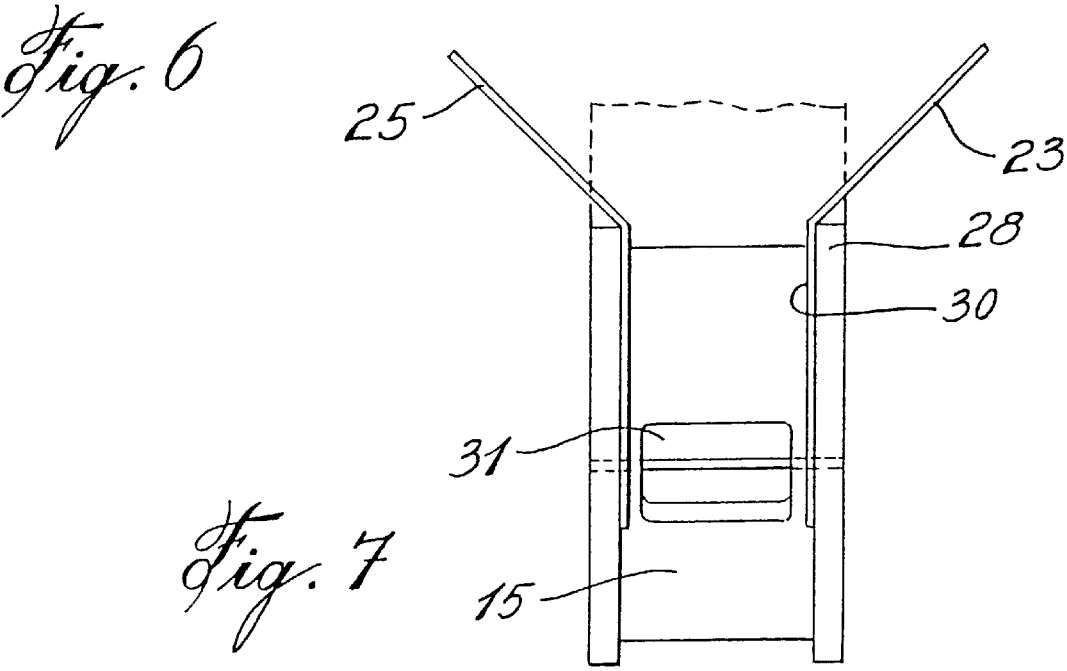
FIG. 7 is an end view showing the positioning of the angle support walls with respect to the drum and the opposed side walls of the removable feed collecting and discharge compartment.

Referring now to FIGS. 3 to 7, there will be described the construction of the drums 15 and their position in the discharge compartment 14. As hereinshown, the drums are circular drums having a flat circumferential side wall 27 and opposed flange walls 28 which project or protrude radially above the circumferential side wall 27 along opposed side end edges thereof. As shown in FIGS. 3, 6 and 7, the removable feed collecting and discharge compartment 14 is also provided with outwardly angled support walls 23 formed in end walls 30 as illustrated in FIG. 6. Such end walls 30 have arcuate cut-outs 29 in their lower edge which are disposed in frictional contact on the portion of the circumferential side wall 27 of the drums, which section extends into the feed collecting compartment. These end walls 30 are disposed inside a respective one of the flanges 28 as is illustrated in FIG. 7 to create a barrier to prevent feed from seeping about the discharge drums 15.

As can be seen from FIGS. 4 and 5, each of the drums 15 are provided with one or more, herein two, opposed feed transport cavities 31. These cavities are located above a horizontal diametrical axis 32 of the drum when at its neutral position. The drums as hereinshown are solid blocks of Teflon with the cavities 31 being machined therein. Drum actuatable means in the form of a weighted bar element 32 extends from the circumferential side wall 27 of the drum and is secured thereto along a diametrical axis which is transverse to the transverse axis 32. The bar element 32 depends from the drum above the feed trough 16. The purpose of this actuatable bar element is to provide a means for the animal, such as a pig 35, as shown in FIG. 2, to actuate or push the bar with its nose or head sideways whereby to cause the drum to rotate on its axle 32 to displace the discharge cavities 31 to transport feed, in a manner as will be described later. This weighted bar 32 further provides a positioning means to automatically position the drum at a non-discharge neutral position, as shown in FIG. 4. In other words, when the bar is pivoted to one side it will automatically come back to rest on its vertical axis 33 wherein the discharge cavities 31 are positioned, as shown in FIG. 4, in a non-feed transport position and accumulate feed therein form the hopper.

Figure 9:
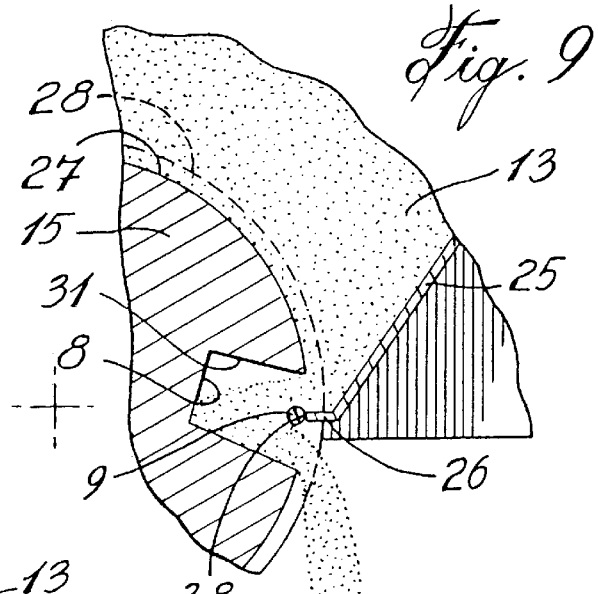
FIG. 9 is a fragmented side view showing the operation of the feed arresting rod of the feed transport cavities.
Figure 10:
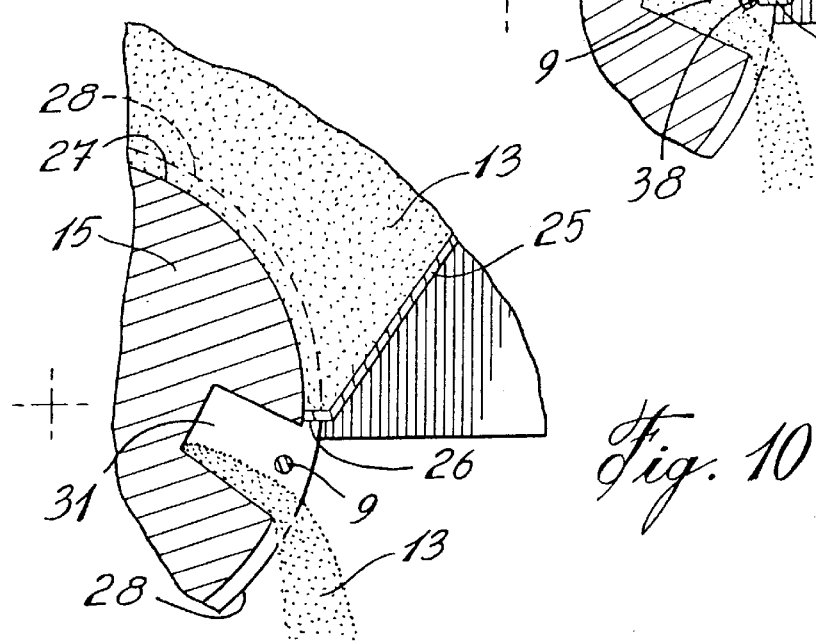
FIG. 10 is a fragmented side view showing the discharge of feed into the feed hopper by the discharge drum when at its full discharge position.

The feed discharge cavities 31 also have a downwardly inclined lower wall 37 to facilitate the discharge of feed as shown in FIG. 10. A feed arresting bar 9 is also secured across the front open end of each cavity 31 midway of the height of the end wall 8 to obstruct the free flow of feed from the hopper to the feed trough 16 when the drum is displaced towards the discharger position, 30 as illustrated by FIG. 9. The bar 9 is constructed of stainless steel and has a diameter of ¼ inch.

Stopper means in the form of arresting pins 34 also project from the circumferential side wall 27 of the drum and disposed at predetermined locations on opposed sides of the weighted bar 36 and below the transverse axis 32 whereby to limit the arcuate displacement of the drum. When rotated, these bars will hit the lower wall section 37 of the inclined walls 25 preventing further rotation of the drum by the displacement of the weighted bar 36.

Figure 8:
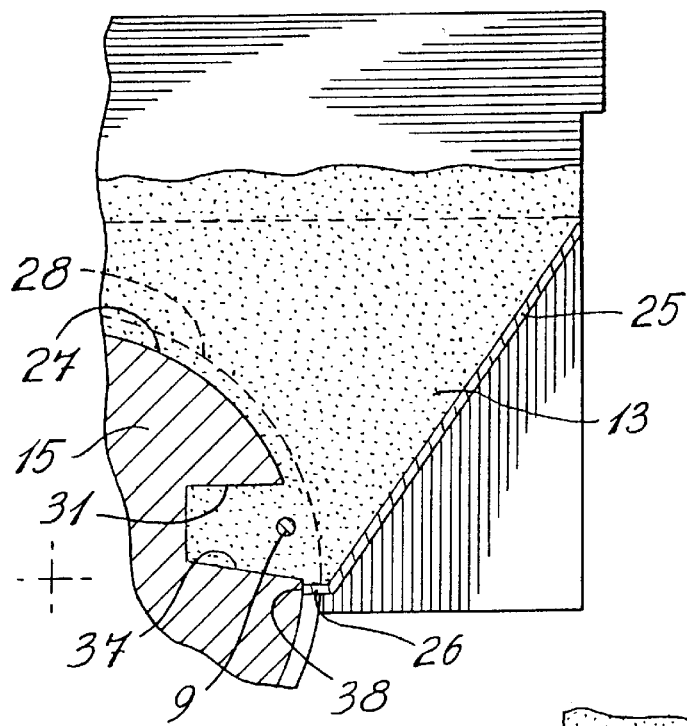
FIG. 8 is a fragmented side view showing the relationship between the inclined lower guide wall and a feed transport cavity of the discharge drum.

Referring to FIGS. 8 to 10 there is shown the operation of the discharge drums 15. At FIG. 8, the drum is at a neutral position where the cavities accumulate feed. At FIG. 9, the utility of the feed arresting bar 9 is illustrated showing its obstruction of the feed in the hopper to prevent a free discharge flow towards the feed trough 16. In FIG. 10 it can be seen that the inclined lower wall 37 of the cavities 31 facilitates complete discharge of the feed 13. As shown in FIG. 9, the rod 9 extends to the circumferential side wall 27 of the drum and in close relationship with the free straight edge 36 of the lower wall section 26 of the inclined wall 25 to arrest or impede the free flow of feed 13 form the discharge compartment 14 to the feed trough 16 via the cavity 31 during the displacement of the drum to its discharge position as shown in FIG. 10. Once rotated to predetermined positions, the feed transport cavity 31 is moved below the lower wall section 26 of the lower guide wall 25 and the feed 13 is discharged into the feed trough 16, as shown in FIG. 10.

As shown in FIG. 2, the lower section 17 of the feed hopper 11 is provided with an elongated vertical opening 40 through which feed is released. The inclined guide walls 12 slope towards this vertical opening to direct feed into the feed collecting compartment 14. In order to strengthen the lower section 17 of the feed hopper and to provide clearance for the hardware disposed outside the side walls 21 of the removable feed collecting and discharge compartment 14, and to further provide ease of installation of the compartment 14, the side walls of the vertical opening 40 are outwardly angled such as shown at 41.

As shown in FIGS. 1 and 2, the animal feeder 10 of the present invention is also provided with a water feed conduit 50 provided with an actuatable valve 51 at a lower end thereof which is actuatable by the feeding animal whereby water can be discharged in the feed trough 16 when required.

Although the feed collecting and discharge compartment 14 is hereinshown as a removable compartment it is conceivable that this compartment can be fixed to the side walls of the hopper and form an integral part thereof. However, this would make the hopper difficult to clean and may not provide the quality of sanitation that the design as hereinshown obtains. Furthermore, although the animal feeder as hereinshown utilizes two drums to provide four feed stations 53, two on each side of the hopper housing 11, many more of these drums can be provided in series in a large hopper with several more feeding stations. The hopper, as well as the removable feed collecting and discharge compartment, are constructed of stainless steel material for sanitation purpose.

Those skilled in the art will appreciate that the conception, upon which this disclosure is based, may readily be utilized as a basis for the designing of other structures or systems for carrying out the several purposes of the present invention. It is important, therefore, that the claims be regarded as including such equivalent constructions, insofar as they do not depart from the spirit and scope of the present invention.

We claim:

1. An animal feeder comprising a feed hopper for the containment of animal feed, said feed hopper having inclined guide walls for directing said feed towards one or more feed discharge drums in a lower section thereof, each said feed discharge drum being secured on a central support axle for rotational displacement thereon, said drum having a circumferential side wall, a portion of said circumferential side wall extending into a feed collecting compartment in said lower section of said feed hopper between opposed straight end walls of said feed collecting compartment, an inclined lower guide wall secured between said opposed straight end walls and having a straight lower edge in frictional contact across said circumferential side wall for directing feed thereagainst, one or more feed transport cavities in said circumferential side wall and displaceable by rotational displacement of said drum on said central support axle to position one of said feed transport cavities above said straight lower edge of said inclined lower guide wall sufficiently to receive said feed therein, a feed trough spaced below said lower section of said hopper, drum actuatable means secured to said drum and depending at least towards said feed trough for actuation by an animal feeding from said trough to discharge feed from said hopper to said trough via said transport cavities, stopper means to restrict the rotational displacement of said drum, and feed arresting means in said feed transport cavities to obstruct free flow of feed during the displacement of said drum to a discharge position.

2. An animal feeder as claimed in claim 1 wherein there is further provided a water feed conduit means having an animal actuatable valve at a discharge end located spaced above said feed trough.

3. An animal feeder as claimed in claim 1 wherein there are two of said feed transport cavities located on opposed sides of said diametrical axis at a predetermined location above a transverse diametrical axis of said drum, each said cavities having an inclined lower wall to facilitate the discharge of feed from said cavities.

4. An animal feeder as claimed in claim 3 wherein said stopper means is an abutment element protruding from said circumferential side wall of said drum and disposed at a predetermined location on opposed sides of said bar element and below said transverse diametrical axis.

5. An animal feeder as claimed in claim 1 wherein there is further provided drum positioning means for automatically positioning said drum at a non-discharge position.

6. An animal feeder as claimed in claim 5 wherein said drum is provided with opposed flange walls protruding radially about said circumferential side wall along opposed side end edges thereof, said opposed straight end walls of said feed collecting compartment having arcuate lower edge sections disposed in frictional contact on said portion of said circumferential side wall extending into said feed collecting compartment and disposed inside a respective one of said flanges to create a barrier for said feed.

7. An animal feeder as claimed in claim 5 wherein there are two or more of said feed discharge drums disposed spaced-apart along said feed collecting compartment.

8. An animal feeder as claimed in claim 5 wherein said drum actuatable means is a bar element secured on a diametrical axis of said drum.

9. An animal feeder as claimed in claim 8 wherein said bar element is a weighted bar element which constitutes said drum positioning means by restoring itself by gravity to assume a vertical position.

10. An animal feeder as claimed in claim 5 wherein said feed arresting means is a rod secured horizontally across said feed transport cavities immediately behind said circumferential side wall and dimensioned for close fit with said straight lower edge of said inclined lower guide wall when displaced adjacent said straight lower edge.

11. An animal feeder as claimed in claim 10 wherein there are two of said feed collecting compartments in said circumferential side wall disposed at a predetermined location above a diametrical axis disposed transverse to a diametrical axis on which a weighted bar element is secured to said drum to constitute said drum positioning means, there being an inclined guide wall on opposed sides of said portion of said circumferential side wall extending into said feed collecting compartment, each said feed collecting compartments being disposed between said inclined guide wall and said barrier plate when said weighted bar element is lying a said non-discharge position.

12. An animal feeder as claimed in claim 10 wherein said feed collecting compartment is a removable feed collecting and discharge compartment seatingly engaged in said lower section of said feed hopper, and means to position and remove said removable feed collection and discharge compartment from said lower section.

13. An animal feeder as claimed in claim 12 wherein said means to position and remove said removable feed collecting and discharge compartment is constituted by elongated vertically extending handles projecting above opposed ends of said removable feed collecting and discharge compartment.

14. An animal feeder as claimed in claim 12 whereas said lower section of said feed hopper is provided with an elongated vertical opening, said inclined guide walls sloping to elongated straight edges of said opening, and outwardly angled lower wall sections below said opening to strengthen said lower section and provide clearance for said removable feed collecting and discharge compartment.

15. An animal feeder as claimed in claim 12 wherein said removable feed collecting discharge compartment has opposed space-apart side walls, said discharge drums being secured between said spaced-apart side walls, an outwardly angled support wall projecting from a respective opposed straight top edge of said side walls for seating support engagement on opposed ones of said inclined guide walls of said hopper, said inclined lower guide wall being secured between said spaced-apart side wall which constitutes said opposed straight end wall, said barrier plate being secured between said spaced-apart side walls of said removable feed collecting and discharge compartment.

16. An animal feeder comprising a feed hopper for the containment of animal feed, said feed hopper having inclined guide walls for directing said feed towards a removable feed collecting and discharge compartment in a lower section thereof, feed discharge drums in said removable compartment, one or more feed transport cavities in a circumferential side wall of said drums and displaceable by rotational displacement of said drum on a support axle to position one of said feed transport cavities to a feed receiving position to receive said feed therein from said hopper, a feed trough spaced below said hopper, drum actuatable means secured to said drum and depending at least towards said feed trough for actuation by an animal feeding from said trough to discharge feed from said hopper to said trough via said transport cavities, stopper means to restrict the rotational displacement of said drum, and feed arresting means in said feed transport cavities to obstruct free flow of feed during the displacement of said drum to a discharge position.

* * * * *